US012560138B2

(12) United States Patent
Ho

(10) Patent No.: US 12,560,138 B2
(45) Date of Patent: Feb. 24, 2026

(54) DEVICE FOR ENHANCING COMBUSTION EFFICIENCY OF COMBUSTION UNIT

(71) Applicant: Hao Wei Environmental Technology Co., Ltd., Taipei City (TW)

(72) Inventor: Chao-Wei Ho, Taipei City (TW)

(73) Assignee: HAI WEI ENVIRONMENTAL TECHNOLOGY CO., LTD., Taipei City (TW)

( * ) Notice: Subject to any disclaimer, the term of this patent is extended or adjusted under 35 U.S.C. 154(b) by 0 days.

(21) Appl. No.: 18/830,996

(22) Filed: Sep. 11, 2024

(65) Prior Publication Data

US 2025/0154924 A1 May 15, 2025

(30) Foreign Application Priority Data

Nov. 9, 2023 (TW) ................................ 112212172

(51) Int. Cl.
*F02M 25/00* (2006.01)
*F02M 27/02* (2006.01)

(52) U.S. Cl.
CPC .................................. *F02M 27/02* (2013.01)

(58) Field of Classification Search
CPC .. B01D 53/94; B01D 2255/202; B01D 53/86; B01D 53/0407; B01D 53/945; F02M 27/02; F02M 25/10; F02M 27/042; Y02E 60/36; F23K 2900/05081; F23K 5/002
See application file for complete search history.

(56) References Cited

U.S. PATENT DOCUMENTS

| | | | | | |
|---|---|---|---|---|---|
| 1,623,053 | A * | 4/1927 | Howard | F02M 1/00 123/524 |
| 2,064,561 | A * | 12/1936 | O'Sullivan | F02M 21/10 123/543 |
| 4,223,642 | A * | 9/1980 | Okubo | C10L 1/1266 123/3 |
| 2007/0241033 | A1* | 10/2007 | Stephenson | C10G 11/10 208/299 |
| 2017/0314518 | A1* | 11/2017 | Xu | F02M 31/125 |

FOREIGN PATENT DOCUMENTS

| | | | | |
|---|---|---|---|---|
| BR | MU8801296 U2 * | 2/2010 | |
| CN | 1085306 A * | 4/1994 | F02M 35/02 |
| EP | 0716225 A1 * | 6/1996 | F02M 27/02 |

(Continued)

OTHER PUBLICATIONS

KR 20200134796 A English translation (Year: 2020).*

*Primary Examiner* — George C Jin
*Assistant Examiner* — Teuta B Holbrook
(74) *Attorney, Agent, or Firm* — Frank Gao, Esq.

(57) ABSTRACT

The present application discloses a device for enhancing combustion efficiency of a combustion unit, including a device body and a cap, wherein the device body has an open end, an accommodation space, a sealed end and an axial direction between the open end and the sealed end, the accommodation space is filled with a comburent that is slowly released and enters the combustion unit via the open end, a first cross sectional area of the open end perpendicular to the axial direction is larger than a second cross sectional area of the sealed end perpendicular to the axial direction, and the cap is detachably connected to the device body to close the open end.

14 Claims, 6 Drawing Sheets

2

(56) References Cited

FOREIGN PATENT DOCUMENTS

| | | | | | |
|---|---|---|---|---|---|
| IT | 202200003731 | A1 | * | 8/2023 | F02M 27/04 |
| JP | H0849604 | A | * | 2/1996 | F02M 25/10 |
| KR | 820002350 | B1 | * | 12/1982 | F02M 25/00 |
| KR | 20090096249 | A | * | 9/2009 | F01B 29/10 |
| KR | 101218587 | B1 | * | 1/2013 | B01D 53/94 |
| KR | 20170086177 | A | * | 7/2017 | F01N 3/36 |
| KR | 20200134796 | A | * | 12/2020 | B01J 23/42 |
| KR | 20220109261 | A | * | 8/2022 | C10L 10/02 |
| WO | WO-9405905 | A1 | * | 3/1994 | F02M 35/02 |
| WO | WO-0151800 | A1 | * | 7/2001 | C10M 175/0091 |
| WO | WO-2023199367 | A1 | * | 10/2023 | C10J 3/725 |

* cited by examiner

3

DEVICE FOR ENHANCING COMBUSTION EFFICIENCY OF COMBUSTION UNIT

CROSS-REFERENCE TO RELATED APPLICATION AND CLAIM OF PRIORITY

This application claims priority to Taiwan Patent Application No. 112212172 filed on Nov. 9, 2023, which is incorporated herein in its entirety by reference.

FIELD

The present application is related to a device for improving the combustion efficiency of a combustion unit, particularly an energy saving and emission reduction device.

BACKGROUND

The power of existing internal/external combustion engines is generated mostly by mixing fuel and air according to a set ratio and then burning the mixture in a combustion chamber. However, fuels such as gasoline and diesel oil used in general internal/external combustion engines will produce a lot of pollutants (such as suspended particulate matters, carbon monoxide, nitrogen oxides, sulfur dioxide, etc.) when burned, which is a major threat to the environment and health.

In addition, for most internal combustion engines such as gasoline engines, their standard parts determine the fuel consumption and combustion efficiency, and it is not easy for users to replace or adjust the parts, resulting in the fuel consumption and combustion efficiency of the old engines being unable to keep up with today's standards. Moreover, because the combustion chamber of an external combustion engine is open, the external combustion engine not only has a low thermal efficiency but also a relatively low combustion efficiency. Due to incomplete combustion of the fuel, the exhaust gas produced contains organic components that may cause cancer or cell mutations.

In order to enhance the combustion efficiency of internal/external combustion engines, it is desired to develop a device without changing the structure of the internal combustion engine but which can enable combustion engines to decrease fuel consumption and pollutant emissions.

SUMMARY

The purpose of present application is to provide an energy saving and emission reduction device that increases the volatilization efficiency of comburents, improves the combustion efficiency of internal/external combustion engines, and reduces the amount of pollutant emissions.

One aspect of the present application discloses a device for increasing volatilization and sublimation efficiencies, which is used to enhance combustion efficiency of a combustion unit comprising an entrance, and the device includes: a tubular body and a cap detachably connected to the tubular body, wherein the tubular body is disposed on the entrance and has an opening, a tube wall and a bottom wall. The tubular body is filled with a comburent entering the combustion unit via the entrance by volatilization or sublimation, and a first maximum width of the opening is greater than a second maximum width of the bottom wall. The cap has an operating end and an engaging portion, and the operating end protrudes radially from the tube wall after the engaging portion engages with the opening.

Another aspect of the present application discloses a device for enhancing a combustion efficiency of a combustion unit, and the device includes a device body having an open end, an accommodation space, a sealed end and an axial direction between the open end and the sealed end, and a cap detachably connected to the device body to close the open end, wherein the accommodation space is filled with a comburent that is slowly released and enters the combustion unit via the open end, and a first cross sectional area of the open end perpendicular to the axial direction is larger than a second cross sectional area of the sealed end perpendicular to the axial direction.

The effect of the present application is: to increase volatilization or sublimation efficiency of the comburent through the special structural design for the device body so that the comburent enters the combustion unit via the opening end of the device body, thereby the combustion efficiency of the combustion unit can be enhanced and the exhaust gas emissions can be significantly reduced, and thus the effects of saving fuel consumption and reducing air pollution can be achieved. Furthermore, since this device has a simple structure and does not take up space, which can be installed at the entrance of the combustion unit through a fixing element, it is more convenient to use.

BRIEF DESCRIPTION OF THE DRAWINGS

The objectives and advantages of the present utility model will become more readily apparent to those ordinarily skilled in the art after reviewing the following detailed descriptions and accompanying drawings.

DETAILED DESCRIPTION OF THE PREFERRED EMBODIMENTS

The present application will now be described more specifically with reference to the following embodiments. It is to be noted that the following descriptions of the preferred embodiments of this utility model are presented herein for purpose of illustration and description only; they are not intended to be exhaustive or to be limited to the precise form disclosed.

The energy saving and emission reduction device in the present application is suitable for being disposed at the entrance of the combustion unit. The term "combustion device/unit" used herein refers to internal combustion engines or external combustion engines, including but not limited to vehicle engines, boilers, etc. The term "entrance" used herein includes, but is not limited to, the intake manifold and the air intake of the air filter, as long as it allows air to flow to the combustion unit.

In one aspect of the present application, a device for increasing volatilization and sublimation efficiency of a comburent is provided for enhancing combustion efficiency of the combustion unit. The comburent includes a catalyst or other substances with combustion-supporting properties, which is transformed into gas by volatilization, mixed with air and flows together to the entrance, thereby enters the combustion unit for combustion. According to the concept of the present application, the device containing the comburent is designed to have a structure that can increase volatilization and sublimation efficiency, such that the volatilized or sublimated comburent can easily enter the combustion unit from the device, thereby the combustion efficiency of the combustion unit is enhanced.

Figure 1A:
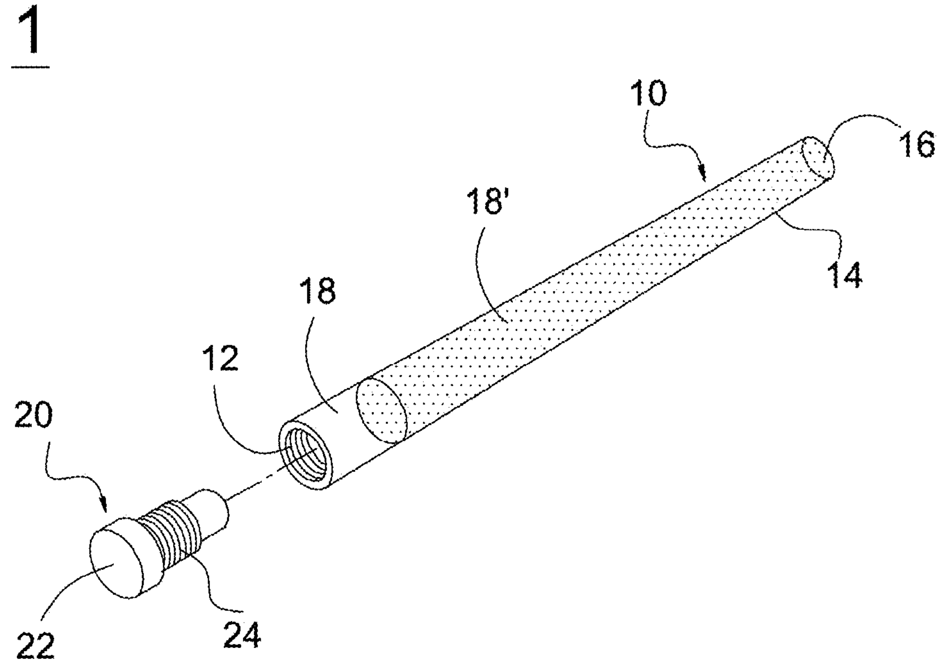
FIG. 1A is an exploded perspective view of a first embodiment of the device of the present application.
Figure 1B:
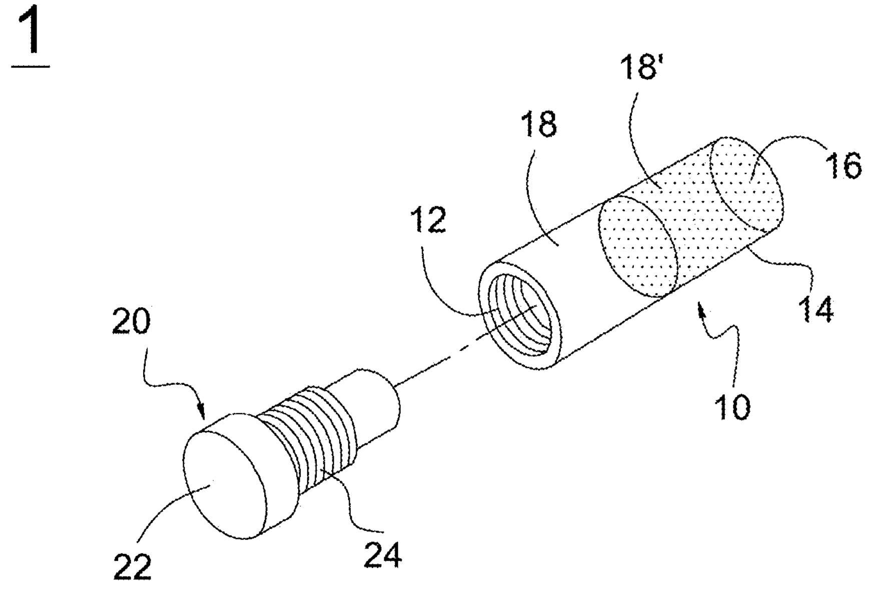
FIG. 1B is an exploded perspective view of second embodiment of the device of the present application.
Figure 2A:
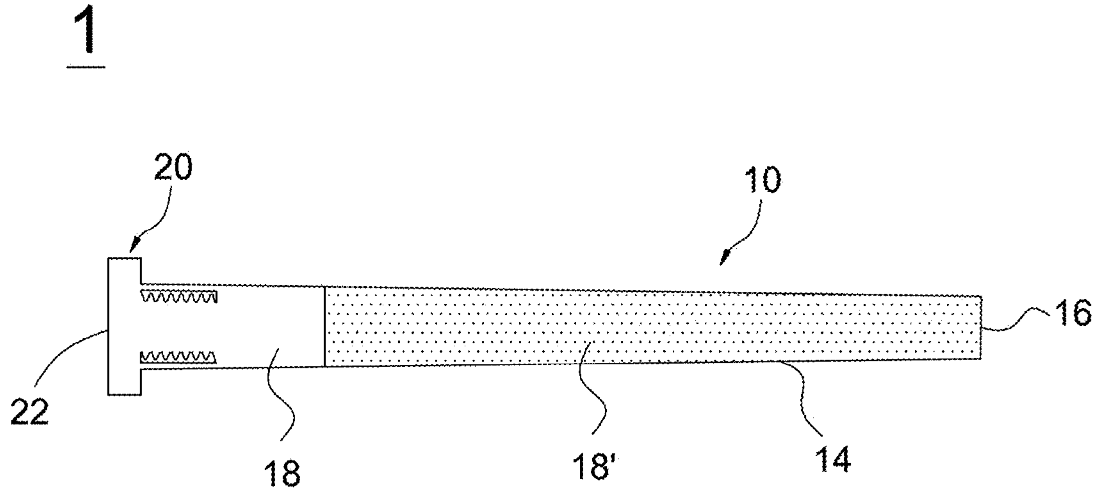
FIG. 2A and FIG. 2B are side cross-sectional views of FIG. 1A and FIG. 1B, respectively.
Figure 2B:
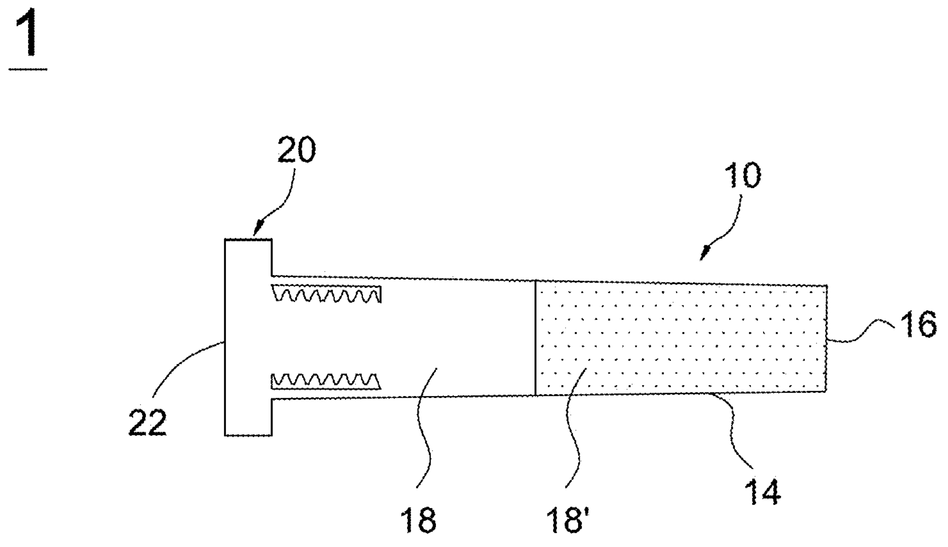

FIG. 1A and FIG. 1B are exploded perspective views of two preferred embodiments of the devices of the present application, and FIG. 2A and FIG. 2B are side cross-sectional views of FIG. 1A and FIG. 1B, respectively. The energy saving and emission reduction devices 1 shown in FIG. 1A and FIG. 1B have the same components, and the only difference lies in the proportion of their appearances. The energy saving and emission reduction device 1 in the present application includes a tubular body 10 and a cap 20, wherein the tubular body 10 has an opening 12, a tube wall 14 and a bottom wall 16, and the tube wall 14 and the bottom wall 16 constitute an accommodation space 18 of the tubular body 10. The accommodation space 18 is filled with a comburent 18', which can be a liquid, a solid, a paste or a gel. Preferably, the comburent 18' includes a composite nobel metal catalyst. In the embodiments depicted in FIG. 1 and FIG. 2, the comburent 18' is a solid, a paste or a gel that does not easily flow out from the opening 12. Because the bottom wall 16 is integrally formed with the tubular body 10, the comburent 18' cannot be lost or released from the bottom wall 16. The comburent 18' in the form of the solid, the paste or the gel is transformed into gas by sublimation, and the comburent 18' in gaseous form flows out of the tubular body 10 via the opening 12 and enters the combustion unit via the entrance, thereby the combustion efficiency of the combustion unit is enhanced.

Continue to refer to FIG. 1A to FIG. 2B. In order to increase the sublimation efficiency, the maximum width of the opening 12 is greater than the maximum width of the bottom wall 16. For example, the diameter of the opening 12 is greater than the diameter of the bottom wall 16 if the opening 12 and the bottom wall 16 are both circular. The dimensions between the widths of the opening 12 and the bottom wall 16 depicted in the figures are not entirely true to scale, and those with ordinary skill in the art can adjust the proportions between the widths of the opening 12 and the bottom wall 16 according to the actual requirements. With an enlarged opening 12, the comburent 18' in the tubular body 10 is more easily released from the opening 12 to enter the combustion unit. Another advantage of the enlarged opening 12 is that it facilitates demolding during manufacturing, which can improve the efficiency of the manufacturing process.

The energy saving and emission reduction device 1 with the enlarged opening 12 in the present application can be designed with different lengths and proportions for the applied internal/external combustion engines. For example, the energy saving and emission reduction device 1 applied in the internal combustion engines can be designed to have an elongated tubular body as shown in FIG. 1A, while the energy saving and emission reduction device 1 applied in the external combustion engines can be designed to have a thick and short tubular body as shown in FIG. 1B.

Continue to refer to FIGS. 1A to 2B. In one embodiment, the cap 20 includes an operating end 22 and an engaging portion 24. The cap 20 is detachably connected to the tubular body 10 through the engaging portion 24. The cap 20 closes the opening 12 when the energy saving and emission reduction device 1 has not been used, and the cap 20 is removed so that the opening 12 is adjacent to the entrance of the combustion unit when the energy saving and emission reduction device 1 is going to be installed at the entrance. FIG. 1A and FIG. 1B show one of the connection methods of the engaging portion 24 and the tubular body 10, in which the external threads on the engaging portion 24 are rotatably engaged with the internal threads on the tube wall 14. However, it can be understood by those with ordinary skill in the art that the engaging portion 24 and the tubular body 10 can also be engaged with each other in other ways. The operating end 22 may have the same or a different shape with the opening 12. For example, both the opening 12 and the operating end 22 may be circular or polygonal (e.g., hexagonal). As shown in FIGS. 2A and 2B, the operating end 22 protrudes radially from the tube wall 14 (i.e. the operating end 22 has a dimension larger than that of the opening 12) to facilitate the user to open the cap 20.

Figure 3:
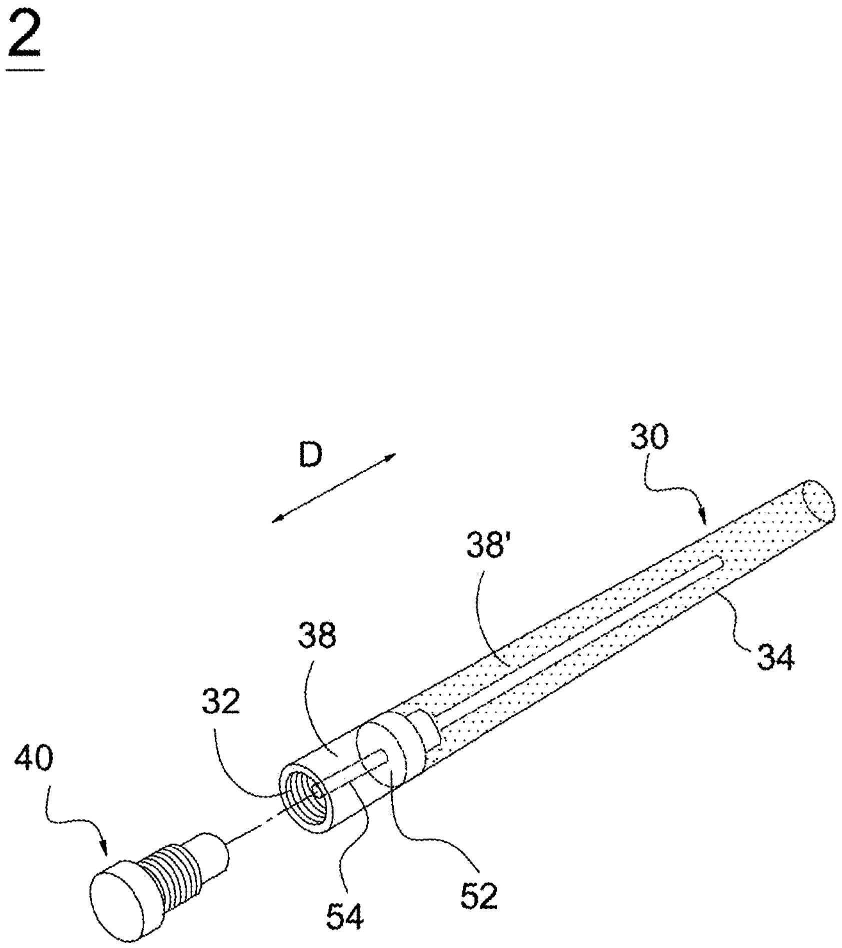
FIG. 3 is an exploded perspective view of a third embodiment of the device of the present application.

FIG. 3 is an exploded perspective view of a further preferred embodiment of the device of the present application. The tubular body 30 and the cap 40 of the energy saving and emission reduction device 2 in FIG. 3 are similar to the tubular body 10 and the cap 20 of the energy saving and emission reduction device 1 in FIG. 1A, which are not described again here. Of course, the tubular body 30 and the cap 40 of the energy saving and emission reduction device 2 in FIG. 3 can also be designed as the tubular body 10 and the cap 20 as shown in FIG. 1B as needed. According to the further preferred embodiment of the present application, the comburent 38' is liquid, preferably including a composite nobel metal catalyst and a base oil. When the comburent 38' is liquid, the energy saving and emission reduction device 2 further includes a blocking element 52 and a supply element 54 to prevent the comburent 38' from leaking through the opening 32. The blocking element 52 is disposed in the tubular body 30, and its outer surface is against the inner surface of the tube wall 34 to limit the comburent 38' in the tubular body 30. The supply element 54 is disposed in the tubular body 30, extends along the axial direction D of the tubular body 30 and passes through the blocking element 52. The supply element 54 is preferably a mandrel including two ends, wherein one end of the supply element 54 adsorbs the comburent 38' by a siphon effect, and the comburent 38' is discharged from the other end of the supply element 54 by the volatilization to flow out of the opening 32. When the energy saving and emission reduction device 2 is installed at the entrance and the cap 40 is removed, the liquid comburent 38' is adsorbed from the one end of the supply element 54 at the accommodation space 38 to the other end of the supply element 54 adjacent to the opening 32 and transformed into gas by the volatilization, and the comburent 38' in gaseous form enters the combustion unit via the opening 32 and the entrance to enhance the combustion efficiency of the combustion unit.

In other embodiments of the present application, the comburent is a solid, a paste or a gel, such as the comburent 18' shown in FIGS. 1A to 2B. When the cap 20 is removed, the blocking element 52 and the supply element 54 can be omitted because the comburent 18' in a solid, pasty or gel state does not tend to leak out from the opening 12.

Through the energy saving and emission reduction device of the present application, the comburent can photolyze the water generated by the combustion reaction into hydrogen that has a self-ignition character and oxygen that can support combustion, thereby the combustion efficiency can be enhanced and the emission of pollutants such as carbon dioxide, carbon monoxide, hydrocarbons, nitrogen oxides, sulfur dioxide and airborne particles (PM2.5) can be reduced. In addition, the energy saving and emission reduction device in the present application can be applied to the internal/external combustion engines that also use other fossil fuels (including natural gas, coal, biomass pellets, and combustible pellets made from recycling waste materials) other than gasoline and diesel. The present application has a very wide range of application.

In another aspect of the present application, a device for enhancing the combustion efficiency of a combustion unit is provided. The device includes a device body with an open end and a cap closing the open end, and the device is filled with a comburent that is slowly released and enters the combustion unit via the open end of the device. The term "slowly released" or "slow release" used herein refers to the release of a substance through a change of state, i.e., a change from such as a liquid to a gas, which is different from the way that the liquid flows out in a liquid state directly. The above-mentioned slow release can be achieved or adjusted through different technical means, including but not limited to changing the structure of the device, using the supply element 54 as shown in FIG. 3, etc. Alternatively, the slow release referred to herein can also be adjusted and controlled using the heat energy of the combustion unit, or using additional heating elements.

Figure 4:
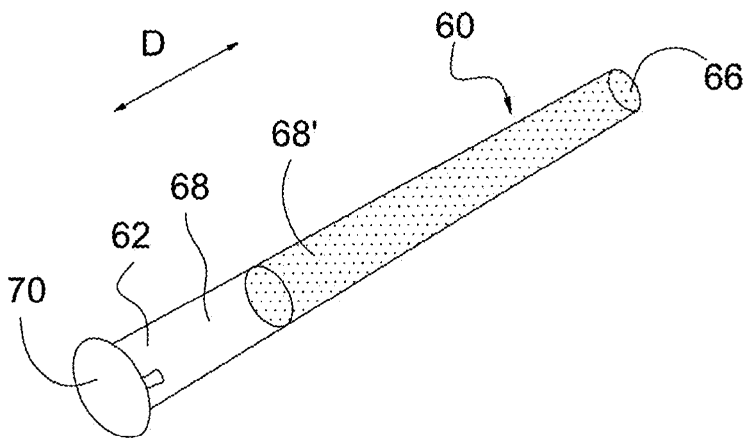
FIG. 4 is an exploded perspective view of a fourth embodiment of the device of the present application.

FIG. 4 is a perspective exploded view of a further preferred embodiment of the device of the present application. The energy saving and emission reduction device 3 of the present application includes a device body 60 and a cap 70, wherein the device body 60 generally has an extended appearance and includes an open end 62, a sealed end 66, an accommodation space 68 and an axial direction D extending between the open end 62 and the sealed end 66. The accommodation space 68 is filled with a comburent 68', which is slowly released (such as by volatilization or sublimation) and enters the combustion unit via the open end 62. This comburent 68' can be a liquid, a solid, a paste or a gel. In the embodiment depicted in FIG. 4, the comburent 68' is a solid, paste or gel, so the blocking element and the supply element are omitted.

Although the device body 60 depicted in FIG. 4 is tubular, it should be understood that the device body 60 in the present application can be in any extended shape (such as columnar), so the cross-sections of the open end 62 and the sealed end 66 perpendicular to the axial direction D can also be in any shape, provided that the cross-sectional area of the open end 62 perpendicular to the axial direction D is greater than the cross-sectional area of the sealed end 66 perpendicular to the axial direction D. Through an enlarged open end 62, the comburent 68' in the accommodation space 68 is more easily released from the open end 62 to enter the combustion unit.

In addition to the caps 20 and 40 shown in FIGS. 1A to 3, the cap used in the energy saving and emission reduction device of the present application also can be embodied as shown in FIG. 4. The cap 70 in FIG. 4 is a sealing membrane, which is detachably connected to the device body 60 for closing the open end 62. The cap 70 covers the open end 62 when the energy saving and emission reduction device 3 has not been used, and the cap 70 is torn off so that the open end 62 is adjacent to the entrance of the combustion unit when the energy saving and emission reduction device 3 is going to be disposed at the entrance.

Figure 5:
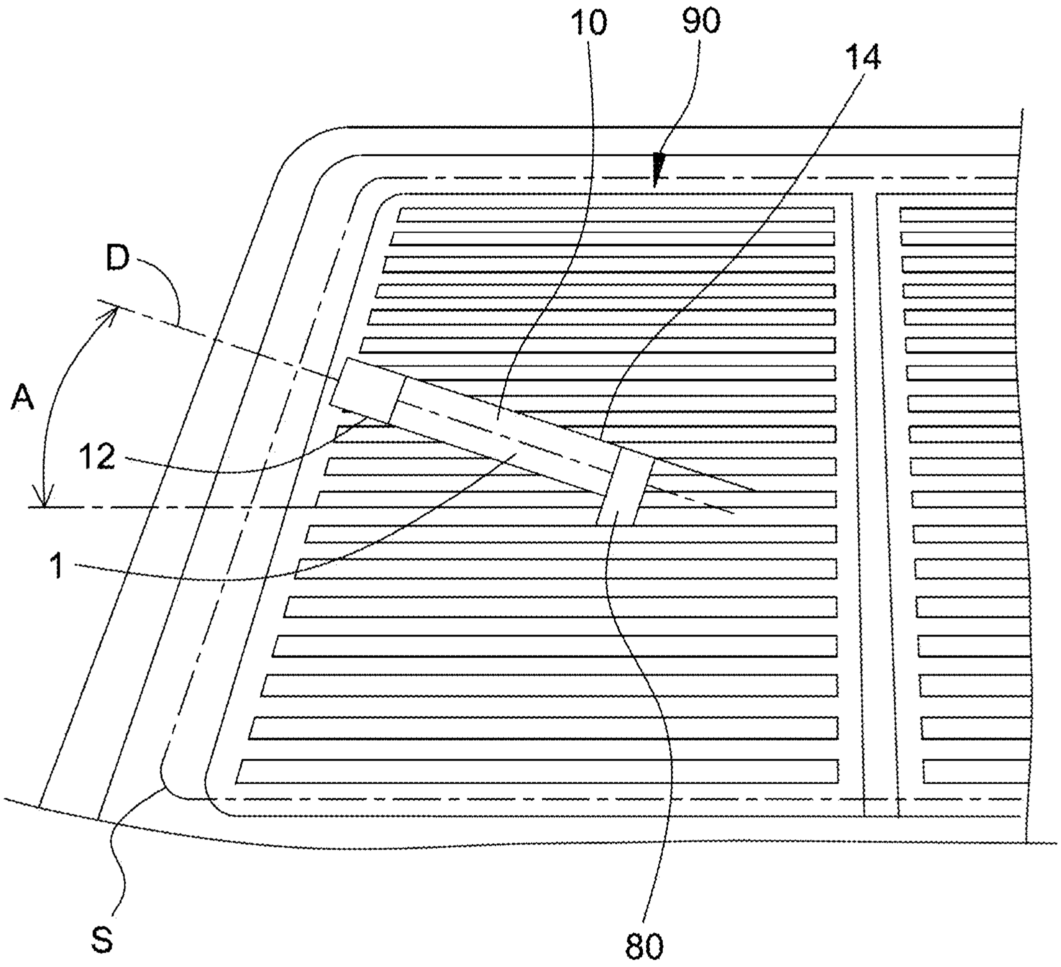
FIG. 5 is a usage scenario diagram illustrating the situation that the device in the present application is disposed on an air filter.

FIG. 5 is a usage scenario diagram illustrating the situation that the energy saving and emission reduction device in the present application is disposed on the air filter. Taking the energy saving and emission reduction device 1 in FIG. 1A as an example, the cap 20 is unscrewed first to separate it from the tubular body 10 before the energy saving and emission reduction device 1 is disposed on the air filter 90, and then a fixing element 80 is used to secure the tubular body 10 on the air filter 90 so that the tubular body 10 is obliquely fixed to the air inlet of the air filter 90. The fixing element 80 is disposed on the outer surface of the tube wall 14 of the tubular body 10 to maintain the relative position between the tubular body 10 and the air inlet of the air filter 90. In one embodiment, the fixing element 80 is an adhesive tape, which is adhered to the outer surface of the tube wall 14 to fix the tubular body 10 to the air filter 90. In other embodiments, the fixing element 80 may be a clamping element, a magnet, or a combination thereof.

As shown in FIG. 5, an angle A is formed between the axial direction D of the tubular body 10 and the parallel surface S of the air filter 90. Preferably, the angle A is between 20 and 40 degrees, more preferably 30 degrees, so that the flowing air can generate an appropriate negative pressure on the opening 12, thereby an appropriate amount of the comburent 18' can be released. When a large amount of air at the air inlet of the air filter 90 flows around the opening 12, the volatilized or sublimated comburent 18' is mixed with the flowing air at the opening 12, and they enter the combustion unit together to create a photolysis reaction with the water vapor generated by the combustion reaction to obtain hydrogen and oxygen. Thereby, the combustion efficiency of the combustion unit is improved and the amount of exhaust gases (such as nitrogen oxides (NOx), CO, $SO_X$, hydrocarbons, etc.) discharged outside is significantly reduced, so as to achieve the effects of reducing pollution and saving fuel consumption.

Figure 6:
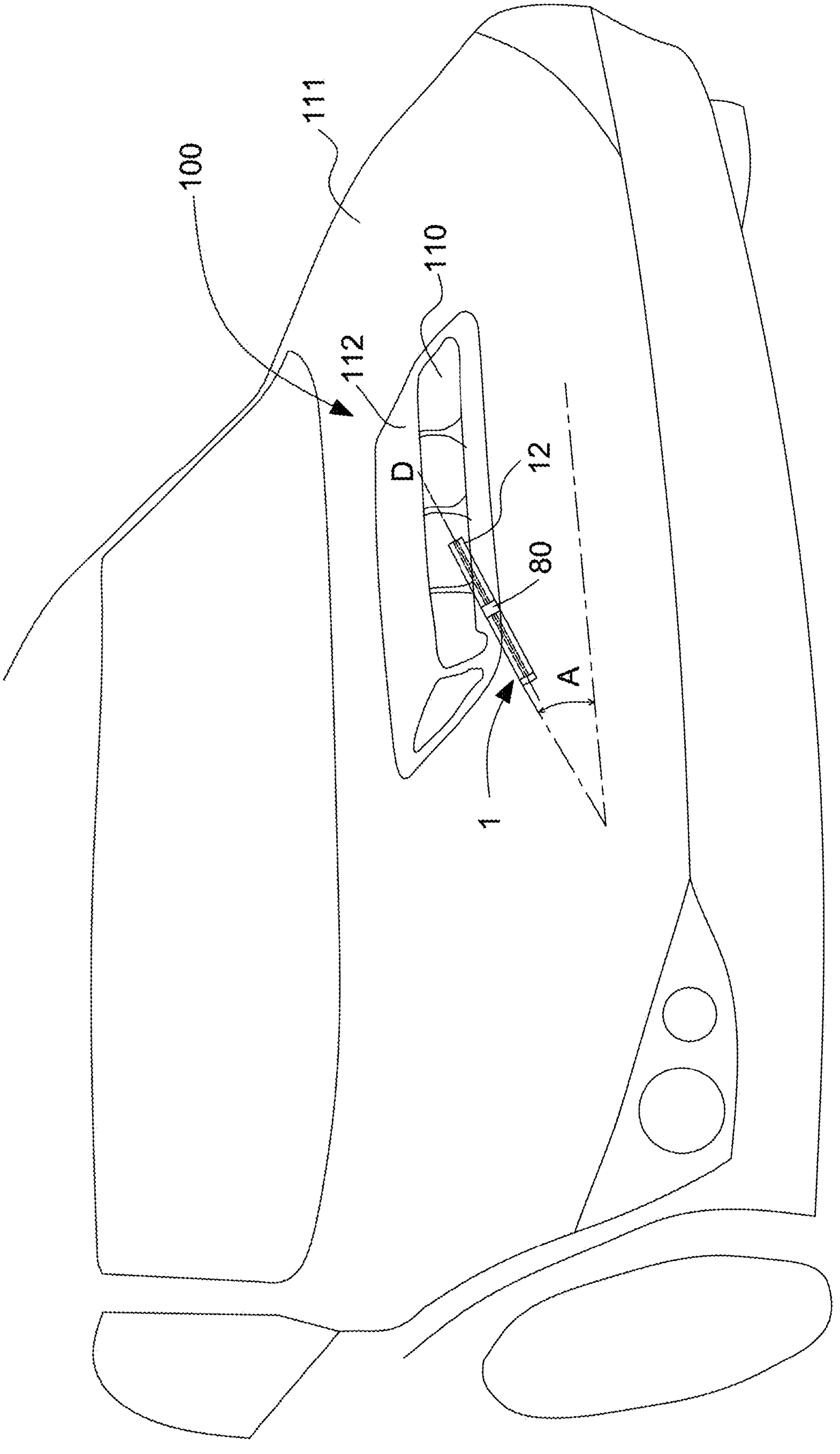
FIG. 6 is a usage scenario diagram illustrating the situation that the device in the present application is disposed at the entrance of an engine.

FIG. 6 is a usage scenario diagram of the energy saving and emission reduction device in the present application being disposed at the entrance of the engine. Different from the situation that the device is disposed on the air filter in FIG. 5, the energy saving and emission reduction device 1 in the embodiment of FIG. 6 is disposed on the entrance 110 of a vehicle engine 100. The vehicle engine 100 includes an engine hood 111 and an air intake duct 112 formed on the engine hood 111 and surrounding the entrance 110. The tubular body 10 is fixed on the air intake duct 112 by the fixing element 80 so that the opening 12 faces the entrance 110. An angle A is formed between the axial direction D of the tubular body 10 and the surface of the engine hood 111. Preferably, the angle A is between 20 and 40 degrees, more preferably 30 degrees, so that the flowing air can generate an appropriate negative pressure on the opening 12, thereby an appropriate amount of the comburent 18' can be released. The assembly method of this embodiment is suitable for the entrances of various combustion units, and is simple and convenient to operate, and thus can meet different usage needs.

When the energy saving and emission reduction device of the present application is disposed at the entrance of the combustion unit, the volatilized or sublimated comburent is brought into the combustion unit with the flowing air through the flowing air at the entrance, thereby improving the combustion efficiency of the combustion reaction and achieving the effect of reducing pollution and saving fuel consumption. Because the installation method of the energy saving and emission reduction device in the present application is simple, it can be disposed independently at the entrance without other driving components, so it can save more energy. On the other hand, the overall structure of the energy saving and emission reduction device in the present application is simple, which not only reduces manufacturing costs, but also is easier to assemble and improves applicability. It can achieve the effects of saving fuel consumption and reducing air pollution without changing the structure of the combustion unit.

It is understood, that this application is not limited to the particular embodiments disclosed, but is intended to cover all modifications which are within the spirit and scope of the present utility model as defined by the appended claims, the above description, and/or shown in the attached drawings.

What is claimed is:

1. A device for enhancing a combustion efficiency of a combustion unit, comprising:

a device body having an open end, an accommodation space, a sealed end and an axial direction between the open end and the sealed end, wherein the accommodation space is filled with a comburent that is slowly released and enters the combustion unit via the open end, and a first cross sectional area of the open end perpendicular to the axial direction is larger than a second cross sectional area of the sealed end perpendicular to the axial direction; and a cap free of through hole and detachably connected to the device body to close the open end.

2. The device as claimed in claim 1, wherein the combustion unit is an internal combustion engine or an external combustion engine and comprises an entrance, and the cap is removed to allow the open end to be adjacent to the entrance when the device is disposed at the entrance of the combustion unit.

3. The device as claimed in claim 2, further comprising:

a fixing element disposed on an outer surface of the device body for maintaining a relative position between the device body and the entrance.

4. The device as claimed in claim 1, wherein the device body is a tubular body or a columnar body.

5. The device as claimed in claim 1, wherein the sealed end is integrally formed with the device body.

6. The device as claimed in claim 1, wherein the comburent is selected from a group consisting of a liquid, a solid, a paste and a gel, and the comburent is transformed into a gas by a volatilization or a sublimation.

7. The device as claimed in claim 6, wherein the comburent is the liquid, and the device further comprises:

a blocking element disposed in the device body, wherein the blocking element has an outer surface against an inner surface of the device body for restricting the comburent in the device body; and a supply element disposed in the device body, extending along the axial direction of the device body and passing through the blocking element, wherein the supply element absorbs the comburent to be discharged from the open end by the volatilization.

8. The device as claimed in claim 6, wherein the first cross sectional area is such greater than the second cross sectional area that the efficiency of the volatilization or the sublimation is increased.

9. The device as claimed in claim 1, wherein:

the cap has an operating end and an engaging portion, and the operating end has a dimension larger than that of the open end; or the cap is a sealing membrane.

10. The device as claimed in claim 9, wherein the operating end is circular or polygonal, the engaging portion has an external thread, and the external thread rotationally engages with an internal thread formed on the device body.

11. A device for enhancing a combustion efficiency of a combustion unit, comprising:

a device body having an open end, an accommodation space, a sealed end and an axial direction between the open end and the sealed end, wherein the accommodation space is filled with a comburent that is slowly released and enters the combustion unit via the open end, and a first cross sectional area of the open end perpendicular to the axial direction is larger than a second cross sectional area of the sealed end perpendicular to the axial direction;

a cap detachably connected to the device body to close the open end;

a blocking element disposed in the device body, wherein the blocking element has an outer surface urging against an inner surface of the device body for restricting the comburent in the device body; and a supply element disposed in the device body, extending along the axial direction of the device body and passing through the blocking element, wherein the supply element absorbs the comburent to be discharged from the open end to enter the combustion unit by the volatilization under a condition that the cap is detached.

12. The device as claimed in claim 11, wherein the comburent is volatile and combustion-supporting.

13. A device for enhancing a combustion efficiency of a combustion unit, comprising:

a device body having a single open end, an accommodation space, a sealed end and an axial direction between the open end and the sealed end, wherein the accommodation space is filled with a comburent that is slowly released and enters the combustion unit via the open end, and a first cross sectional area of the open end perpendicular to the axial direction is larger than a second cross sectional area of the sealed end perpendicular to the axial direction; and a cap detachably connected to the device body to close the open end, wherein the comburent is volatile and combustion-supporting.

14. The device as claimed in claim 13, wherein the comburent is a liquid, and the device further comprises:

a blocking element disposed in the device body, wherein the blocking element has an outer surface urging against an inner surface of the device body for restricting the comburent in the device body; and a supply element disposed in the device body, extending along the axial direction of the device body and passing through the blocking element, wherein the supply element absorbs the comburent to be discharged from the open end to enter the combustion unit by the volatilization under a condition that the cap is detached.

* * * * *